United States Patent
Cohan

(10) Patent No.: US 9,124,553 B2
(45) Date of Patent: *Sep. 1, 2015

(54) SYSTEM AND METHOD FOR AUTOMATIC DATA SECURITY BACK-UP AND CONTROL FOR MOBILE DEVICES

(71) Applicant: Todd Michael Cohan, New York, NY (US)

(72) Inventor: Todd Michael Cohan, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/322,997

(22) Filed: Jul. 3, 2014

(65) Prior Publication Data
US 2014/0315517 A1 Oct. 23, 2014

Related U.S. Application Data

(63) Continuation of application No. 13/287,523, filed on Nov. 2, 2011, now Pat. No. 8,811,965, which is a continuation-in-part of application No. 12/287,868, filed on Oct. 14, 2008, now Pat. No. 8,107,944.

(51) Int. Cl.
| | |
|---|---|
| *H04M 3/00* | (2006.01) |
| *H04L 29/06* | (2006.01) |
| *H04M 1/66* | (2006.01) |
| *H04W 12/08* | (2009.01) |

(52) U.S. Cl.
CPC ............ *H04L 63/0263* (2013.01); *H04M 1/66* (2013.01); *H04W 12/08* (2013.01)

(58) Field of Classification Search
USPC ......................................... 455/418, 419, 420
See application file for complete search history.

(56) References Cited

U.S. PATENT DOCUMENTS

| | | | | |
|---|---|---|---|---|
| 2006/0079215 | A1* | 4/2006 | Perrella et al. | 455/417 |
| 2008/0114862 | A1* | 5/2008 | Moghaddam et al. | 709/220 |
| 2009/0092108 | A1* | 4/2009 | Hargrave et al. | 370/338 |

* cited by examiner

*Primary Examiner* — Omoniyi Obayanju
(74) *Attorney, Agent, or Firm* — Triangle Patents, PLLC

(57) ABSTRACT

Systems and methods for providing security and control of mobile communications device activity including at least one mobile communication device with software operable thereon for receiving rules provided by an authorized user of the device(s) and in accordance with those rules administering actions to provide for controlling and security data stored or generated on the device(s), including logging data and activities related to the mobile communications device, blocking and filtering calls, messages, websites, emails, and combinations thereof, via wireless communication with a remote server computer having a corresponding software module operable thereon for managing and implementing the rules.

20 Claims, 2 Drawing Sheets

SYSTEM AND METHOD FOR AUTOMATIC DATA SECURITY BACK-UP AND CONTROL FOR MOBILE DEVICES

CROSS-REFERENCE TO RELATED APPLICATIONS

This application is a continuation of U.S. application Ser. No. 13/287,523, filed Nov. 2, 2011, which is a continuation-in-part of U.S. application Ser. No. 12/287,868, filed on Oct. 14, 2008, both of which are incorporated herein by reference in their entirety.

BACKGROUND OF THE INVENTION

1. Field of the Invention

The present invention relates generally to data security, back-up, logging, monitoring and control for mobile communication devices. Further, the present invention relates to mobile communication devices and remote access and automatic control for data security, back-up, and logging based on user-defined rules and the systems, and methods relating thereto.

2. Description of the Prior Art

Generally, it is known in the relevant art to provide systems and methods for communication record logging, mobile web log related to device activity, and data back-up. Also, generally it is known in the relevant art to provide for security related to mobile devices, including portable computers and mobile communication devices and personal digital assistant (PDA) devices. By way of example, the following U.S. Patents and Publications are provided:

U.S. Pat. No. 7,069,003 for "Method and apparatus for automatically updating a mobile web log (blog) to reflect mobile terminal activity," filed Oct. 6, 2003 by Lehikoinen, et al., describes a mobile terminal including a memory storing application software and data that is descriptive of the use of the mobile terminal, a display and controller that is responsive to the application software and to at least a sub-set of the stored data for visualizing on the display, in graphical form, the use of the mobile station over time.

U.S. Publication 2007/0111704 for "System and method for communication record logging," filed Oct. 16, 2006 by Linkert, et al., discloses a method for maintaining a log of communications initiated or received at a portable electronic device, including short message service (SMS) messages, personal identification number (PIN) messages, and cellular telephone calls, wherein the method includes receiving a data record from each of the communications, extracting information from the data record, and storing information in a log file.

U.S. Publication 2007/0281664 for "Portable wireless terminal and its security system," filed May 16, 2007 by Kaneko, et al., teaches a portable wireless terminal, like a cellular phone, and its security system for preventing by remote control improper use of the portable wireless terminal by a third party when it is lost or stolen, including data back-up to a remote center by remote control from the center via a wireless network, and including encryption, public-private key, and data fragmentation.

U.S. Publication 2007/0299631 for "Logging user actions within activity context," filed Jun. 27, 2006 by Macbeth, et al., includes maintaining a log of user keystrokes, files accessed, files opened, files created, websites visited, communication events, for example phone calls, instant messaging, communications, etc.

U.S. Publication 2008/0233919 for "System and method for limiting mobile device functionality," filed Feb. 9, 2005 by Kenney, discloses mechanisms for selectively disabling mobile device functionality to prevent unauthorized access to personal data stored on the mobile device, like bank account numbers, social security numbers, and credit card numbers. Thus there remains a need for systems and methods that provide for automatically controlling data security, back-up, logging, access and for providing remote access to the data back-up and mobile communication device operation, based upon user-defined rules for such automation, rather than merely providing security for the incidence of lost or stolen mobile communication devices.

SUMMARY OF THE INVENTION

A first aspect of the present invention includes methods for automatically providing control and security for mobile communication devices and data created and/or stored thereon, including steps of logging data and activities related to the mobile communications device, blocking and filtering calls, SMS messages, MMS messages, (photos) Instant Messages, websites, emails, and combinations thereof, via wireless communication with a remote server computer having a corresponding software module operable thereon for managing and implementing rules that are initially selected or generated by authorized user(s) of the device(s). Different levels of access and rules authority are preferably provided for different users, such as a first user being a system administrator or parent having one level and a device user or child having a second, lower grade level that is subjected to limitations based on the first user, all for the same device.

A second aspect of the present invention is to provide a system having at least one mobile communication device with software operable thereon for receiving rules provided by an authorized user of the device(s) and in accordance with those rules administering actions to provide for controlling and securing data stored or generated on the device(s), including logging data and activities related to the mobile communications device, blocking and filtering calls, voicemail, SMS messages, MMS messages, (photos), Instant Messages, websites, emails, social media applications such as Facebook, LinkedIn, Twitter and the like and combinations thereof, via wireless communication with a remote server computer having a corresponding web-based software module operable thereon for managing and implementing the rules. The web-based software will also be used to access the logs, records for device activities including applications and enable/disable device locking options.

None of the prior art references provide for authorized user-based rules selection, modification and remote management and implementation for mobile communications devices to include rules governing all aspects of data security and device security, such as data back-up, device operation and access to predetermined numbers, contacts, and/or websites or addresses, device receipt of calls, messages, SMS messages, MMS messages, (photos), Instant Messages, social media applications such as Facebook, LinkedIn, Twitter and the like and websites from predetermined or all numbers, contacts, and/or websites or addresses for predetermined duration or dates/times, in addition to device locking and application control and management.

These and other aspects of the present invention will become apparent to those skilled in the art after a reading of the following description of the preferred embodiment when considered with the drawings, as they support the claimed invention.

DETAILED DESCRIPTION

Figure 1:
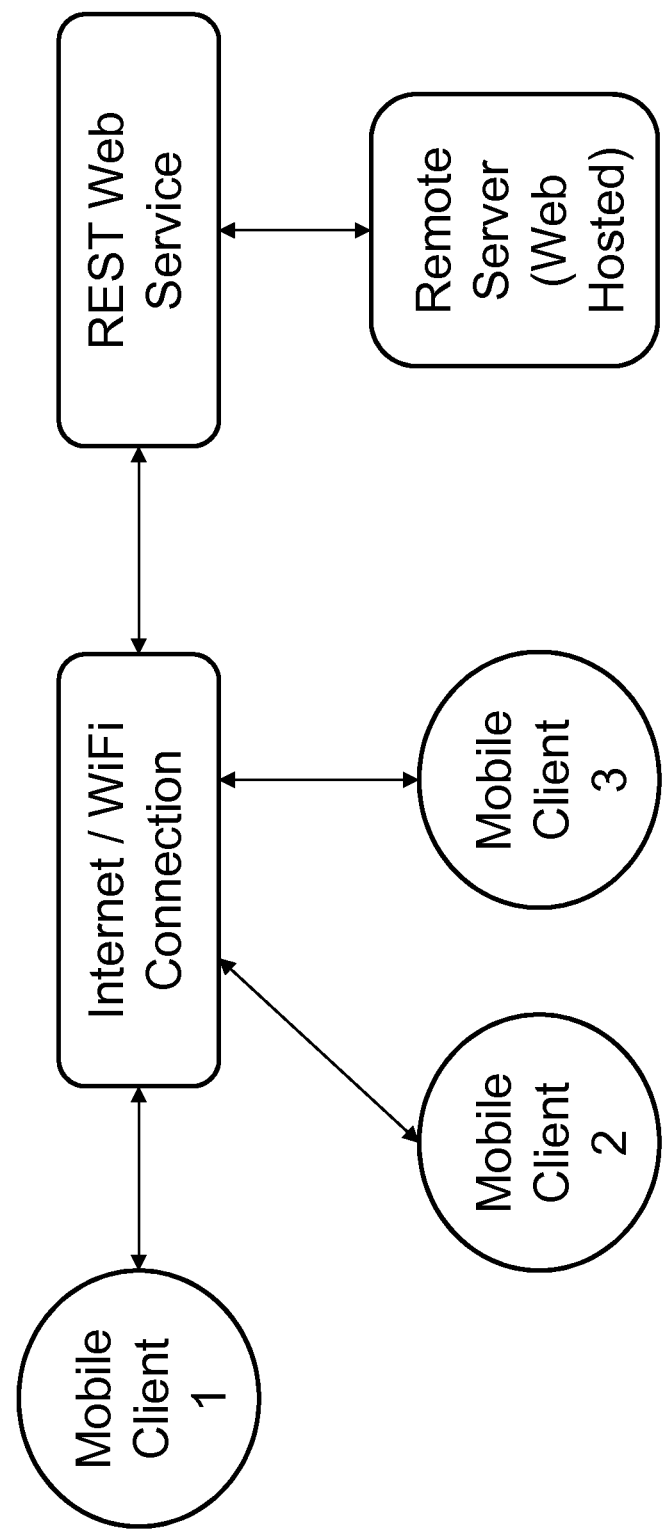
FIG. 1 illustrates a schematic diagram illustrating one embodiment of the system according to the present invention.

Referring now to the drawings in general, the illustrations are for the purpose of describing a preferred embodiment of the invention and are not intended to limit the invention thereto.

The present invention provides for a system having at least one mobile communication device with software operable thereon for receiving rules provided by an authorized user of the device(s) and in accordance with those rules administering actions to provide for controlling and security data stored or generated on the device(s), including logging data and activities related to the mobile communications device, blocking and filtering calls, messages, SMS messages, MMS messages, (photos), Instant Messages, social media applications such as Facebook, LinkedIn, Twitter and the like, websites, emails, and combinations thereof, via wireless communication with a remote server computer having a corresponding software module operable thereon for managing and implementing the rules. Accordingly, FIG. 1 illustrates a schematic diagram illustrating one embodiment of the system according to the present invention, including a remote server computer (RSC), wireless network communication signals, a REST based web service to connect mobile device to RSC, and at least one mobile device in communication with the RSC, data stored in memory on the device(s) and having back-up data stored in memory at the RSC. One of ordinary skill will understand and appreciate that other computer components including processors, input/output devices and displays with graphical user interface operability are included in the system for providing user inputs and for reviewing status indication of the rules and status of implementation on device (s) via remote access or direct access to the server through a network via the target device or other non-target devices not governed by the rules.

Figure 2:
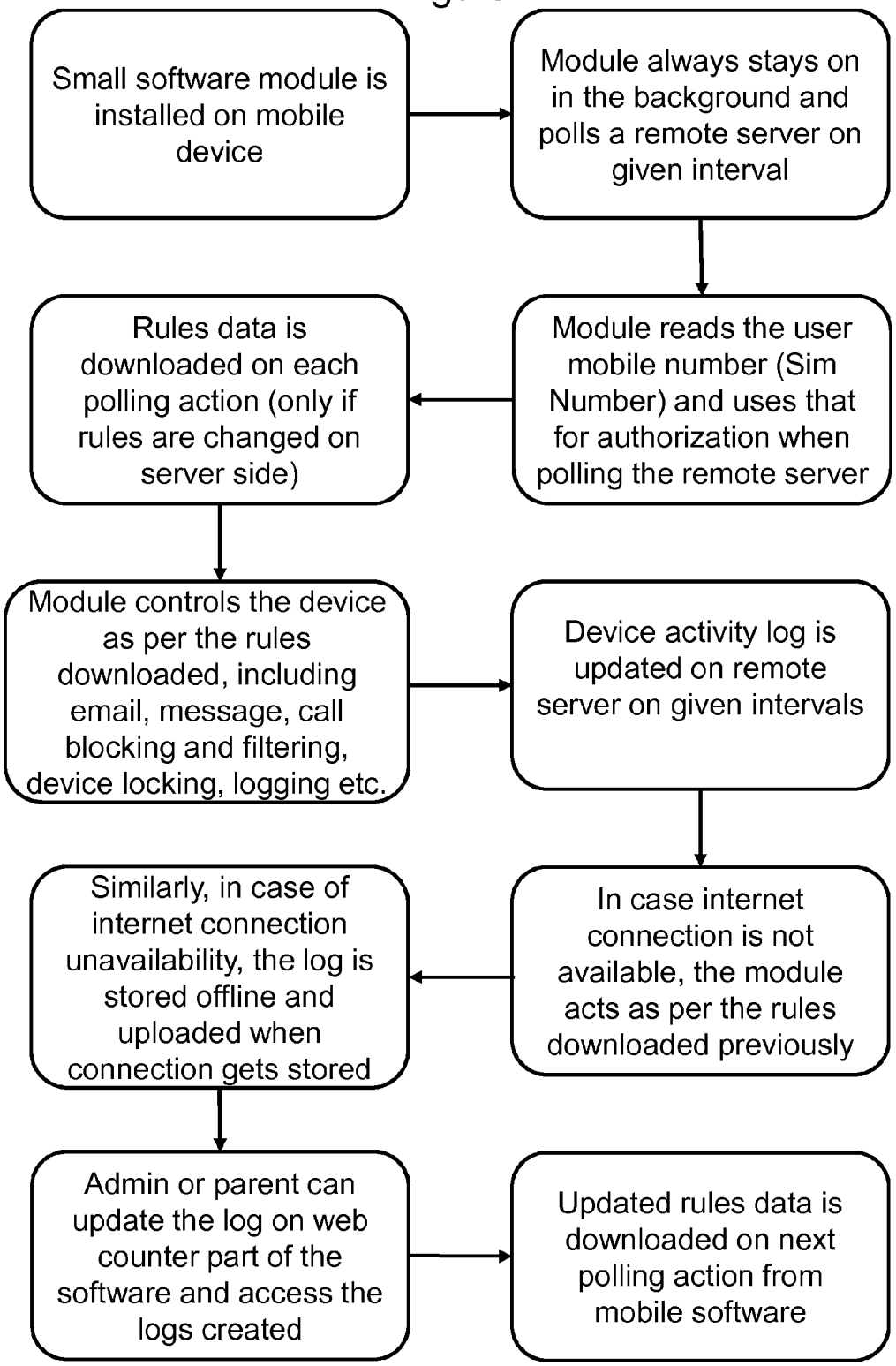
FIG. 2 shows a flow diagram illustrating steps involved with methods of the present invention.

Additionally, the present invention provides methods for providing automatic control and security for mobile communication devices and data created and/or stored thereon based upon rules selected by an authorized user of the device, including steps of providing software operable on the device for logging data and activities related to the mobile communications device, blocking and filtering communication, including data and voice conversations in real-time and voicemail left on the carrier network, calls, messages, SMS messages, MMS messages, (photos), Instant Messages, social media applications such as Facebook, LinkedIn, Twitter and the like, websites, emails, and combinations thereof, via wireless communication with a remote server computer and system as set forth hereinabove. FIG. 2 shows a flow diagram illustrating steps involved with methods of the present invention, providing the software program module operable on the mobile communication device, and steps associated with associating an authorized user(s) with the device as set forth hereinbelow, the software program module operating with the following steps: being activated upon installation or download and operating substantially continuously for polling and/or communication with a remote server computer, downloading rules from the server including initial rules and rules updates as available, administering the rules for controlling the device operation, uploading data to the server, wherein the data includes activity log, activity data, duration, frequency, content, etc., storing select data on the device, storing select data only when the device is offline, and combinations thereof The present invention further provides for forwarding the data in a customizable format, making it readable and searchable to a third-party vendor or to the customer's server on premises. Thus, the device software and the RSC provides for all SMS messages, Instant Messages, (chat), MMS messages, (photo), social media applications such as Facebook, LinkedIn, Twitter and the like, voice conversations and voicemail left on the carrier network to be captured, logged, archived and made searchable by the customer via the graphical user interface or sent to a third-party provider or to customers premise.

Preferably, the steps include an authorized user associated with at least one mobile communication device or an administrator establishing rules governing the operation of the functions of the system for providing data and device security and remote access to same by the authorized user. The rules may be selected from predetermined options or generated uniquely by the user and input to the system by the authorized user following an authentication and/or authorization step. The device-operable software functions to provide the steps according to those rules, including but not limited to logging and storing data input and/or generated on the mobile communication device, blocking and/or filtering phone calls, messages, and/or websites, archiving data and tagging it for retrieval and optional searchability, auditing and reporting and locking the device from predetermined selected or all activity for a duration or programmed date(s) and corresponding time(s).

In preferred embodiments of the present invention, the rules for all functionality of the software and corresponding device security and data security and all associated activities are defined by the authorized user(s) of the device or the device owner or administrator. In the case of corporate or business mobile communications, the device authorized user may have a first predetermined level of rules options for selection and implementation, and a system administrator or supervisor may have a second predetermined level of rules options that provide for overriding and/or limiting selections of the actual device user. Similarly, in the case of minor children, a child device authorized user may have a first predetermined level of rules options and the parent(s) may have a second predetermined level of rules options that provide for administrative authorization and access to the data back-up, as well as blocking and filtering and device locking functions. For example, the second predetermined level of rules may include: remote wipe/erase of the device, remote lock of the device, clearing and resetting the password, preventing certain applications from being installed and/or deleted and locking use of camera and the like.

Other examples include the device software and RSC providing mobile applications to be installed, uninstalled and managed remotely over the network directly to the mobile device. The system and device tracks and controls approved and unapproved applications being installed on the device and ensures users install approved applications. Also the system and device manage, lock, and permit users to access specific web-based applications, mobile applications and SaaS services and internet sites. The device software and RSC further provides for remote control of which devices are permitted or prohibited to connect to an internal network.

The device software and the RSC according to the present invention also provide for a "push" notification prompting the device to check in for tasks, policies and queries.

A complete inventory management of the devices which have the device software installed and are "connected" to the RSC is provided for, including user authentication, certificate enrollment and device configuration.

In any case, the rules can be selected, generated and input to the system through a web-based user interface accessible by any web-enabled device, including but not limited to the target mobile communication device(s) to which those rules would apply. Additionally, rules may be updated, modified, reviewed, and eliminated by authorized users through the same type of user interface via the web, regardless of device access. As will be understood and appreciated, user authentication and authorization may be provided in a number of ways, including, by way of example and not limitation, a user identification (userID) and corresponding password, passcode, or personal identification number (PIN). Additional authorized users can be added or removed through this system only if an authorized user accesses the system securely with the userID and corresponding passcode. Biometric authentication and other forms of user identification and authentication may be provided in substitute or supplement as appropriate. Preferably, the rules are administered via software operable from the RSC side, thereby providing a smaller software footprint operable on the device, i.e., providing a client side application as a small utility installed or downloaded on the mobile communication device upon registration with the system; in this manner, the application can always be operable or "on" to manage implementation of the rules on the device(s) without interfering with regular operation or draining power or memory in a significant manner. The client side application is operable to poll the RSC on regular and predetermined intervals for checking for new rules data, uploading logs from the device to the RSC, and functioning to conform to any other rules associated directly with that device. A single authorized user can add multiple devices in the system and thus control more than one device from within the same interface. This way, in corporate environments, a single admin can control all devices of the organization and similarly the parents can control devices for all children. Unlike prior art logging functions for remote communication devices, the present invention logging extends beyond SMS messaging, MMS messaging, IM messaging, social media applications such as Facebook, LinkedIn, Twitter and the like, call activity logging, i.e., identifying what calls and SMS messages originate on the device or that were received or calls missed to that device. The present invention provides for logging of SMS messages, MMS messages, and telephone calls and recordings left on the carrier network, including inbound or outgoing, and preferably includes additional data associated therewith (the call timers, name data from contacts and so on), including rules implementation such as call time limitation to predetermined numbers or recipients. Also, logging includes information relating to browsing history, including website information and URL, duration and frequency of website visit, downloading history, and other similar activities. Also, text messaging email messaging, MMS messaging, (photos) and $3^{rd}$ party chat application data and social media applications such as Facebook, LinkedIn, Twitter and the like are included in the logging functions of the present invention. Importantly, with the automated rules implementation including back-up of data and logging information, the present invention provides for the elimination of stored data on the mobile communications device since the device can actively connect with the RSC for retrieving data rather than storing data on the device directly. The data is stored on device on temporary basis if the internet connection is not available and is uploaded to RSC when connection is restored. When uploading the system maintains a parity check for upload activity and unless the data is uploaded successfully, the transactions are not considered as complete. Rules governing data retained on the device in the case of limited wireless connectivity but need for access to certain predetermined information are preferably provided.

Additionally, the RSC controls device security by providing for blocking and filtering of calls, SMS messages, MMS messages, Instant Messages, Social Media messages, $3^{rd}$ party chat applications, banking transactions and URLs based upon the rules. Either predetermined or all numbers or initiators can be blocked from sending communication, data, messages, or calls to the device(s). Also, keywords, key phrases and number sequences can be used as the basis for blocking and/or filtering as well. Selective or all URL blocking or filtering of websites based upon URL, owner, content, etc. is also provided, based upon the rules.

In preferred embodiments, the RSC and software associated with the server side module of the present invention provide for scalability without limitation to number of devices and geographic locations, networks, etc. Initial embodiments provide for software supporting Windows Mobile, Google Android, Symbian and RIM Blackberry and Apple iOS devices that are commercially available globally; however, platforms, devices, and operating systems of mobile communications devices can be addressed through software modifications for compatibility and improvements, as well as new devices. The RSC software is designed in consideration to add more platforms and no changes are required on server side software when adding new mobile platforms.

The present invention also further provides for mobile communication device having automated security and control of device functionality including: a mobile device with a software program module operable thereon, wherein the module administers rules that govern device functionality, including filtering and blocking communication to and/or from the device, logging device activity, storing data associated with device activity, including activity frequency, duration and content, and combinations thereof; as well as other functionality set forth hereinabove relating to those aspects of the system applicable at the device level.

Additionally, the system can filter and block such information as passwords or identification numbers such as social security numbers from leaving the device and alert the administrator to these. The system may also similarly filter, block and alert for PING probes. A policy of flagging words, phrases or number sequences can be used to enhance the security of the device.

Certain modifications and improvements will occur to those skilled in the art upon a reading of the foregoing description. By way of example, the blocking and filtering steps may extend beyond phone calls, SMS messages, IM messages MMS messages, Social Media messages, emails, and websites to further include blocks and filtering of advertising, location information, transactions including commercial transactions, money transactions and solicitations of any form to the mobile communication device, based upon the rules selected and/or predetermined by the authorized user of the device. Similar options for backup and restore of contacts, calendar and other vital data are also available. The abovementioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A method for providing controls for a mobile communications device comprising:
    providing a web interface to access the device and a server over a network;

receiving rules through the web service and storing the rules on the device and/or the server;

the device polling the server and receiving rules from the server, wherein the rules can be updated, modified, reviewed, and eliminated by an authorized user;

the device activating and controlling predetermined functionality in the received rules, wherein the predetermined functionality includes filtering, blocking, storing, and backing-up of data transfers of the device; wherein the predetermined functionality also includes remote wipe/erase of the device, remote lock of the device, remote clearing and resetting password of the device, preventing predetermined applications from being installed and/or deleted, and remote locking use of camera; wherein the blocking includes blocking any calls to the device from telephone numbers listed in any of the rules and blocking access to any website listed in any of the rules;

uploading data from the device to the server, wherein the data includes an activity log of the data transfers and at least one storage or back-up of the data transfers.

2. The method of claim 1 wherein the device includes wireless communication and the network includes a wireless network.

3. The method of claim 1 wherein the step of receiving rules through the web service includes receiving the telephone numbers listed in the rules and the website or websites listed in the rules.

4. The method of claim 1 further comprising:
providing at least one device user with a user level;
wherein any of the rules further include at least one user level;
applying the rules having the same user level as the user to the device when the device is accessed by the user;
the device having unique predetermined functionalities based on the user level of the user.

5. The method of claim 1 wherein the data is stored on the device when the device is offline.

6. The method of claim 1 wherein the functionality further includes tagging at least one of the data transfers, for retrieval and searchability when stored or backed-up.

7. The method of claim 1 wherein the data transfers include data and voice conversations in real-time, voicemails left on the network to and/or from the device, third-party applications installed on the device which may be transmitting either data and/or voice, SMS message, IM messages, MMS messages, emails, text-based communications and/or browser activity.

8. The method of claim 1 wherein storing includes storing frequency, duration and/or content of data transfers.

9. The method of claim 1 wherein blocking further includes blocking receipt of advertising listed in the rules or all advertising, the device transmitting device location, and/or functionality of performing commercial transactions.

10. The method of claim 1 further erasing the storage and/or the back-up of the data transfers on the device and/or the server through the web service.

11. The method of claim 1 wherein blocking further includes blocking receipt of the data transfers based on phrases, content and/or number sequences.

12. A system for providing controls for a mobile communications device comprising:
a web interface, the device and a server, each configured to communicate over a network;
wherein rules are input and stored on the device and/or the server for activating predetermined functionality in the rules for controlling the device, wherein the predetermined functionality includes filtering, blocking, storing, and backing-up of data transfers of the device; wherein the predetermined functionality also includes remote wipe/erase of the device, remote lock of the device, remote clearing and resetting password of the device, preventing predetermined applications from being installed and/or deleted, and remote locking use of camera;

wherein blocking includes blocking any calls to the device from telephone numbers listed in the rules and blocking access to any website listed in the rules;

wherein the device is configured to poll the server and receive additional rules and update rules from the server;

wherein the device is configured to upload data to the server including an activity log of the data transfers and at least one storage or back-up of the data transfers.

13. The system of claim 12 further comprising:
users each with a user level;
wherein any of the rules further include at least one user level;
wherein the rules having the same user level as the user are activated for controlling the predetermined functionality of the device.

14. The system of claim 12 wherein the data is stored on the device when the device is offline.

15. The system of claim 12 wherein the functionality further includes tagging at least one of the data transfers, for retrieval and searchability when stored or backed-up.

16. The system of claim 12 wherein blocking further includes blocking receipt of advertising listed in the rules or all advertising, the device transmitting device location, and/or functionality of performing commercial transactions.

17. A controllable mobile communications device comprising:
an interface for receiving user inputs, a memory for storing rules and software, a processor for processing the rules and the software, and a wireless communications component for providing access to a network;
wherein processing the rules includes activating predetermined functionality in the rules for controlling the device; wherein the predetermined functionality includes filtering, blocking, storing, and backing-up of data transfers; wherein the predetermined functionality also includes remote wipe/erase of the device, remote lock of the device, remote clearing and resetting password of the device, preventing predetermined applications from being installed and/or deleted, and remote locking use of camera;
wherein blocking includes blocking any calls to the device from telephone numbers listed in the rules and blocking access to any website listed in the rules;
wherein processing the software includes polling a server and receiving additional rules and update rules from the server over the network;
wherein processing the software includes uploading data to the server including an activity log of the data transfers and at least one storage or back-up of the data transfers.

18. The device of claim 17 further comprising:
wherein each user input is associated with a user level;
wherein any of the rules further include at least one user level;
wherein the rules having the same user level as the user input are activated for controlling the predetermined functionality of the device.

19. The device of claim 18 wherein blocking further includes blocking receipt of the data transfers based on phrases, content and/or number sequences.

20. The device of claim 18 wherein blocking further includes blocking receipt of advertising listed in the rules or all advertising, the device transmitting device location, and/or functionality of performing commercial transactions.

\* \* \* \* \*